United States Patent Office 3,789,049
Patented Jan. 29, 1974

3,789,049
GLASS FIBER-REINFORCED EPOXY RESIN OR POLYESTER RESIN COMPOSITION AND METHOD FOR MANUFACTURING SAME
Takeshi Nagasawa, Katsumasa Kuroiwa, and Kouichi Narita, Koriyama, Japan, assignors to Nitto Boseki Co., Ltd., Gonome, Fukushima-shi, Japan
Filed Dec. 20, 1971, Ser. No. 209,571
Claims priority, application Japan, Dec. 23, 1970, 45/129,041
Int. Cl. C08g 51/10
U.S. Cl. 260—40 R
8 Claims

ABSTRACT OF THE DISCLOSURE

A glass fiber-reinforced, epoxy resin or unsaturated polyester resin composition comprising glass fiber, an epoxy resin or an unsaturated polyester resin, and, at the interface of said glass fiber and resin, a reaction product of a partially epoxidized polybutadiene having at least about 50 mole percent of 1,2-structure with a mercaptoorganosilane of the formula,

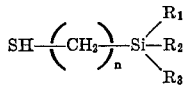

Figure 1:
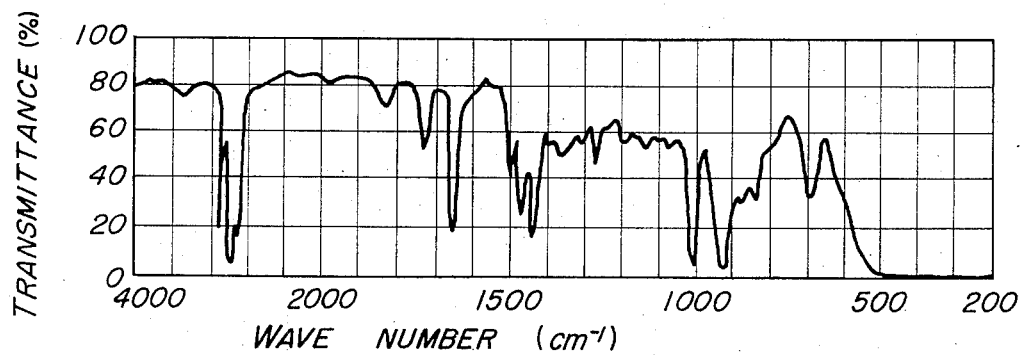

wherein $R_1$, $R_2$ and $R_3$, which may be the same or different, represent hydrolyzable radicals capable of reacting with glass fiber, for example, alkoxy groups having 1 to 3 carbon atoms, acetoxy groups or halogen atoms, and $n$ is an integer of from 1 to 4. By the presence of said reaction product at the interface, the adhesion between the glass fiber and the resin is improved and there is obtained a reinforced plastic having a high strength and excellent transparency.

This invention relates to a glass fiber-reinforced plastic improved in adhesion between the glass fiber and an epoxy resin or an unsaturated polyester resin, and to a method for manufacturing the same. More particularly, this invention relates to a glass fiber-reinforced plastic improved in adhesion between the glass fiber and the resin by the presence, at the interface between said glass fiber and said epoxy resin or unsaturated polyester resin, of a reaction product of a partially epoxidized polybutadiene having a high 1,2-structure content with a mercaptoorganosilane represented by the formula,

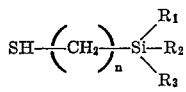

wherein $R_1$, $R_2$ and $R_3$, which may be the same or different, represent hydrolyzable radicals capable of reacting with glass fiber and $n$ is an integer of from 1 to 4; and to a method for manufacturing the same.

Heretofore, various surface-treating agents have been applied to inorganic substances to promote bonding between the inorganic substances and organic substances. In the glass fiber industry, particularly these surface-treating agents have played an important role in manufacturing glass fiber-reinforced plastics comprising a combination of glass fibers and thermosetting resins.

As the surface-treating agent for glass fibers used in reinforced plastics industry, there has been employed a compound having a silicon or chromium atom as nucleus and both functional group capable of easily reacting with glass fiber and functional group capable of easily reacting with the resin, which functional groups are bonded to the atom. Such a compound is believed to form chemical primary bonds to the glass and the resin in the reinforced plastic.

In these surface-treating agents, the functional groups capable of easily reacting with the glass include, for example, halogen atoms, alkoxy groups and acetoxy group, which are hydrolyzable, and the functional groups capable of easily reacting with the resin include, for instance vinyl, acryl, allyl, acryloxy, epoxy and amino groups. The vinyl group, acryl group, and the like are used, of course, aiming at vinyl polymerization through their unsaturated bonds. Examples of such surface-treating agents include vinyltrichlorosilane, vinyltrimethoxyethoxysilane, methacryloxypropyltriethoxysilane, glycidoxypropyl triethoxysilane, γ-aminopropyltriethoxysilane, and methacrylatochromic chloride.

On the other hand, the present inventors had found that as compared with the above-mentioned conventional surface-treating agents, a high molecular weight compound obtained by addition reaction of a mercaptoorganosilane represented by the formula,

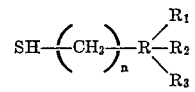

wherein $R_1$, $R_2$, $R_3$ and $n$ are the same as defined above, with the side chain vinyl groups of a polybutadiene having at least about 50 mole percent of so-called 1,2-structure in its microstructure, i.e. a polybutadiene having a high 1,2-structure content, greatly improves the adhesion of glass fibers to an unsaturated polyester resin, and gives excellent glass fiber-reinforced plastics, and disclosed and claimed in their copending application based on Japanese patent application No. 72,247/70. The present inventors have done further research on said high molecular weight surface-treating agent and, as a result, have succeeded in developing a surface-treating agent which gives an excellent glass-reinforced plastic when applied, above all, to an epoxy resin.

An object of this invention is to provide a glass fiber-reinforced plastic improved in adhesion between the glass fiber and an epoxy resin or unsaturated polyester resin.

Another object of this invention is to provide a glass fiber-reinforced plastic improved in adhesion between glass fiber and epoxy or unsaturated polyester resin by the presence, at the interface between said glass fiber and the epoxy or unsaturated polyester resin, of a reaction product of a partially epoxidized polybutadiene having a high 1,2-structure content with a specified mercaptoorganosilane.

Other objects and advantages of this invention will be apparent from the following description.

According to the invention, there is provided a glass fiber-reinforced plastic which comprises glass fibers, an epoxy resin or unsaturated polyester resin and a reaction product of a partially epoxidized polybutadiene having a high 1,2-structure content with a mercaptoorganosilane represented by the formula,

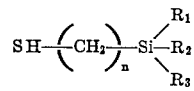

wherein $R_1$, $R_2$, $R_3$ and $n$ are the same as defined above, the reaction product being present at the interface between said glass fiber and said resin, whereby the adhesion between the glass fiber and the resin is improved, the resin being cured.

Alkoxy groups having 1 to 3 carbon atoms, acetoxy groups and halogen atoms (preferably chlorine or bromine atom), for example, may be used as $R_1$, $R_2$ and $R_3$ in the above formula. These groups have been well known as the functional groups or atoms capable of being hydrolyzed to form a chemical primary bond with glass in the abovementioned conventional surface-treating agents. These $R_1$, $R_2$ and $R_3$ may be the same as or different from one another, but in view of convenience in synthesis they are preferably the same. Examples of the compounds represented by the above formula include mercaptomethyltrimethoxysilane,
β-mercaptoethyltrimethoxysilane,
β-mercaptoethyltriethoxysilane,
β-mercaptoethyltripropyloxysilane,
β-mercaptoethyltrichlorosilane,
β-mercaptoethyltribromosilane,
γ-mercaptopropyltrimethoxysilane,
γ-mercaptopropyltriethoxysilane,
γ-mercaptopropyltris(β-methoxyethoxy)silane,
γ-mercaptopropyltripropyloxysilane,
γ-mercaptopropyltriacetoxysilane,
γ-mercaptopropyltrichlorosilane,
γ-mercaptopropyltribromosilane,
γ-mercaptopropyltriiodosilane,
δ-mercaptobutyltriethoxysilane, and
δ-mercaptobutyltripropyloxysilane.

Mercaptoorganosilanes represented by the above mentioned formula, including these compounds, may be used alone or in admixture of two or more in the reaction with the epoxidized polybutadiene having a high 1,2-structure content.

The term "partially epoxidized polybutadiene having a high 1,2-structure content" used herein means such a polybutadiene having about 50 mole percent to substantially 100 mole percent of 1,2-structure, that is, a polybutadiene containing about 50 mole percent to substantially 100 mole percent of monomeric butadiene units having vinyl groups in the form of pendant, said side chain vinyl groups being epoxidized by oxidization. In the present invention, the polybutadiene has a degree of polymerization of 4 to about 100.

As is well-known, by polymerization of conjugated 1,3-butadiene, there is obtained a butadiene polymer containing as its microstructural units three types of structures, namely, cis-1,4-, trans-1,4-, and 1,2-structures. On the other hand, the research made by Natta et al. revealed that when 1,3-butadiene is polymerized with a catalyst consisting of, for example, vanadium acetylacetonate or chromium acetylacetonate and triethylaluminum, or a catalyst consisting of tetraalkoxymethane and triethylaluminum, the steroregular polymerization takes place to yield a polybutadiene containing about 50 mole percent to substantially 100 mole percent of 1,2-structure and a relatively small proportion of or substantially no cis-1,4 and trans-1,4 structures. Such a type of polybutadiene has since been manufactured on a commercial scale.

In the present invention, there is used a polybutadiene having many side chain vinyl groups, a part of which has been epoxidized by oxidation with, for example, peracetic acid or hydrogen peroxide, that is, a part of the vinyl groups, —CH=CH$_2$, having been oxidized into

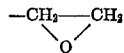

It is known, however, that in the epoxidation of such a polybutadiene, the susceptibility of side chain vinyl group to the oxidation reaction remains substantially constant when the content of 1,2-structure exceeds 50 mole percent.

In the present invention, the epoxidation rate of the above-mentioned polybutadiene should be determined considering various factors, such as the 1,2-structure content in the polybutadiene and the amount of the treating agent adhered to the glass fiber. However, in general, a value within such a wide range as 5-70 mole percent (based on the side chain vinyl group) can be taken. Preferable epoxidation rate within the above-mentioned range can easily be determined by experiment. For example, when a polybutadiene having a 1,2-structure content of about 70 to 100 mole percent is used, an epoxidation rate of 10 to 40 mole percent (based on the side chain vinyl group) is preferred. In this case, it is preferable that 10 to 40 mole percent (based on the 1,2-structure content prior to epoxidation) of mercaptoorganosilane is added to the epoxidized polybutadiene and the thus obtained addition product is adhered to the glass fiber in a proportion of 0.05 to 1.5% by weight based on the weight of the glass fiber.

The reaction of the epoxidized polybutadiene used in this invention with a mercaptoorganosilane represented by the aforementioned formula is carried out similarly to the reaction of an unepoxidized polybutadiene having a high 1,2-structure content with said mercaptoorganosilane, in an ordinary solvent for polybutadiene such as toluene, benzene, ethyl alcohol, n-hexane or the like, at an elevated temperature and/or in the presence of a radial initiator such as azobisisobutyronitrile, benzoyl peroxide, cumene hydroperoxide, peracetic acid, ammonium persulfate, potassium persulfate or the like.

In the above reaction, the mercaptoorganosilane addition-reacts mainly with the side chain vinyl groups remaining unepoxidized in the partially epoxidized polybutadiene, and scarcely reacts with the epoxy groups. Further, even if there are double bonds resulting from cis- and trans-1,4-structures in the main chain, the mercaptoorganosilane hardly reacts with these double bonds. In said addition reaction, it is known that the reactivity of side chain vinyl group remains substantially constant when the 1,2-structure content in the polybutadiene exceeds 50 mole percent.

The difference in chemical structure between the said reaction product and the starting polybutadiene and mercaptoorganosilane is apparent from the accompanying drawings.

Figure 2:
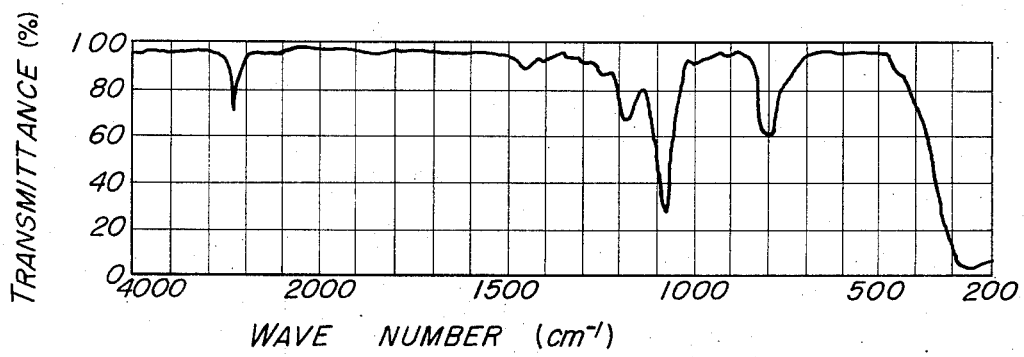
Figure 3:
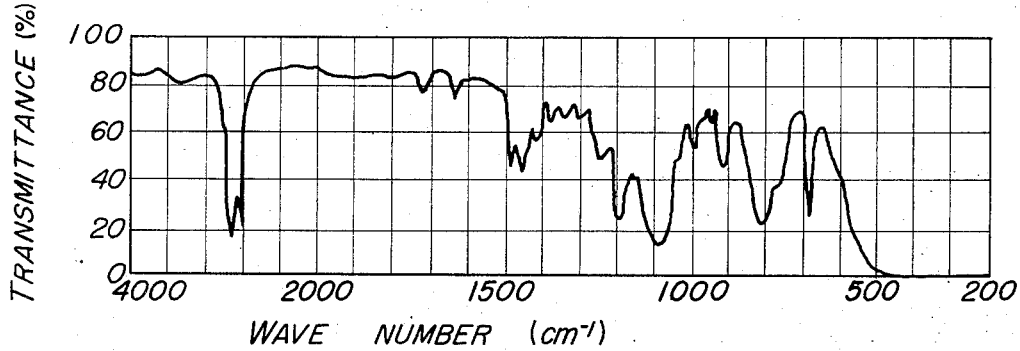

In the accompanying drawings, FIG. 1 is the infrared absorption spectrum of epoxidized polybutadiene; FIG. 2 is the infrared absorption spectrum of γ-mercaptopropyltrimethoxysilane; FIG. 3 is the infrared spectrum of a reaction product of the epoxidized polybutadiene and the γ-mercaptopropyltrimethoxysilane.

In the present invention, not all the side chain vinyl groups of the above-mentioned epoxidized polybutadiene are required to be added to by the mercaptoorganosilane of the above-mentioned formula, and unreacted, i.e. free, vinyl groups may be present in the polybutadiene. Particularly, when an unsaturated polyester is used as the resin, the unreacted vinyl groups, if present, are vinylpolymerized with the unsaturated polyester to form crosslinkages, and hence, it is rather preferable for the present invention that the unreacted vinyl groups are present. On the other hand, when all the side chain vinyl groups of the epoxidized polybutadiene have been reacted with the mercaptoorganosilane, no vinyl groups can, of course, be reacted with the resin. Even in this case, however, sufficient bonding can be achieved between the reaction product and the resin owing to the affinity of the polybutadiene to the epoxy or unsaturated polyester resin, or if the unsaturated polyester resin is used and the polybutadiene has double bonds resulting from cis-1,4- and trans-1,4-structures in its main chain, it can be done owing to the above-mentioned affinity and the reaction between the unsaturated polyester and the double bonds.

In the reaction of the above-mentioned epoxidized polybutadiene with the mercaptoorganosilane, the rate of reaction should be determined considering various factors, such as the 1,2-structure content in the polybutadiene, the epoxidation rate and the amount of the treating agent adhered to glass fiber. However, in general, a value within a wide range of 5 to 70 mole percent (based on the 1,2-structure content in the polybutadiene prior to epoxidation) can be taken. The preferable rate of reaction of mercaptoorganosilane corresponding to the specified ranges for the above-mentioned conditions can easily be determined by experiment. For example, when a polybutadiene having a 1,2-structure content of about 70 to 100 mole percent is 10–40% epoxidized, it is preferable that the mercaptoorganosilane is added in a proportion of 10 to 40 mole percent.

Concerning the reaction between the side chain vinyl group of a polybutadiene having a high 1,2-structure content and a thiol compound such as a mercaptoorganosilane, a detailed explanation has been made in Japanese patent application No. 61,567/68 on an invention by the same inventors as the present ones.

When the present surface-treating agent for glass fibers, which is synthesized by the above-said reactions, is applied to an epoxy resin, a strong bond is formed between the epoxy resin and the surface-treating agent through the side chain epoxy group of the latter, resulting in an excellent glass fiber-reinforced epoxy resin. Moreover, the present surface-treating agent shows a high affinity toward a polyester resin, and can also be used in manufacturing a glass fiber-reinforced polyester resin.

In the process of the present invention, as the epoxy resin, there may be mainly used an epoxy resin prepared by condensation reaction between a bisphenol or its derivative and epichlorohydrin and having at least two terminal epoxy groups. Further, there may be used epoxy resins prepared by using phenols or aliphatic compounds, such as polybutadiene, cyclohexene oxide and the like, as the starting material.

The unsaturated polyester resins which may be used in the present invention include solutions in polymerizable monomers of alkyd resins prepared by polycondensing unsaturated polybasic acids and polyhydric alcohols together with saturated polybasic acids for enhancing properties. As said unsaturated polybasic acids, there may be used, for example, maleic anhydride, fumaric acid, chloromaleic acid, dichloromaleic acid, citraconic acid, itaconic acid, and the like. The polyhydric alcohol includes, for instance, ethylene glycol, diethylene glycol, propylene glycol and pentaerythritol. The saturated polybasic acid includes succinic acid, adipic acid, sebasic acid, phthalic anhydride, terephthalic acid, tetrachlorophthalic acid and Het acid. The polymerizable monomer includes, for instance, styrene, vinyltoluene, vinyl acetate, methyl acrylate and methyl methacrylate.

In the present invention, glass fiber for reinforcing said epoxy resin and/or said unsaturated polyester resin may be conventional glass fiber for laminate.

The glass fiber-reinforced epoxy resin or unsaturated polyester resin composition of the present invention can be produced by applying to glass fiber a reaction product of the above-said partially epoxidized polybutadiene having a high 1,2-structure content with the above-said mercaptoorganosilane in an ordinary way in the form of a solution or emulsion, drying the same and then impregnating the thus treated glass fiber with an epoxy or unsaturated polyester resin containing a catalyst, or alternatively, by mixing the said reaction product and the catalyst with the epoxy or unsaturated polyester resin, and then impregnating glass fiber with the resulting mixture (integral process). The glass fibers impregnated with the resin is heated under pressure in a conventional way to cure the epoxy or unsaturated polyester resin, resulting in a glass fiber-reinforced plastic.

The amount of the reaction product adhere to glass fiber, in general, is 0.05 to 1.5%, preferably 0.1 to 1.0% by weight based on the weight of the glass fiber. In the integral method, the reaction product, in general, is mixed with the resin in an amount of 0.3 to 7%, preferably 0.5 to 5% by weight based on the weight of the resin. An appropriate amount of the reaction product adhered or mixed, however, should be determined taking into consideration the 1,2-structure content in the polybutadiene, the epoxidation rate and the rate of reaction of the mercaptoorganosilane with the polybutadiene.

In the above-mentioned methods, when the reaction product is used in the form of a solution, a conventional organic solvent such as benzene, toluene, acetone or methyl ethyl ketone can be used. However, the reaction product is generally used in the form of an aqueous emulsion, because the solution method has disadvantages such as problems in the handling of the solvent, the recovery of the solvent, and increased cost due to use of the solvent. Such an emulsion is prepared by dissolving the said reaction product in the above-said solvent, emulsifying the resulting solution in water with a siutable emulsifier such as, for example, 5CX–1002 (trade name for an alkylphenol-based emulsifier produced by Takemoto Yushi) or Hymal 101 (trade name for a nonionic surface-active agent comprising mainly polyethylene derivative of alkylphenol produced by Matsumoto Yushi), and then diluting the emulsion with water. In this case, the pH of the emulsion is 1.5 to 8.0, preferably 2.5 to 4.5. No particular limitation is applied to the acid for adjusting pH, though, in general, acetic acid is used. The reaction product content in the emulsion is preferably from 0.5 to 1.5% by weight.

For curing the epoxy resin or unsaturated polyester resin, there may be used conventionally known catalysts such as dicyandiamide and dimethylbenzylamine for epoxy resins and benzoyl peroxide and dicumyl peroxide for unsaturated polyester resins.

In the above methods, better results may generally be obtained by treating glass fibers directly with the above-said reaction-product (in the form of a solution or an emulsion) than by the integral method.

Thus, according to this invention, a reinforced plastic of a high strength and of extremely good transparency may be manufactured by applying to glass fibers a small quantity of an addition-reaction product obtained by reacting a small amount of an expensive organosilane compound with a large amount of an inexpensive expoxidized polybutadiene. In other words, according to this invention, a reinforced plastic of a high strength and of excellent transparency may be obtained by merely applying to glass fibers nearly the same amount of the above-said addition-reaction product in substantially the same as that of a conventional organosilane compound known as a surface-treating agent for glass fibers, and hence by applying only a small amount of silane. It is to be noted that the only surface-treating agent for epoxy resins conventionally used in practice is glycidoxypropyltrimethoxysilane which is an extremely expensive treating agent. According to this invention, by using a small amount of a readily available silane compound, there may be obtained a reinforced plastic having performance comparable to that of a reinforced plastic obtained by using the above-said conventional compound.

The invention is explained below with reference to examples, which are merely by way of illustration and not by way of limitation.

Example 1

In 500 parts by weight of benzene was dissolved 196 parts by weight of a commercially available polybutadiene having a polymerization degree of 20 (molecular weight about 1,000) and containing 80 mole percent of 1,2-structure, 13 mole percent of trans-structure and 7 mole percent of cis-structure, about 30 mole percent of said 1,2-structure having been epoxidized. To the resulting solution was added 1.64 parts by weight (1 mole percent) of azobisisobutyronitrile and then, with stirring, 196.3 parts by weight (1 mole percent) of γ-mercaptopropyltrimethoxysilane. The reaction was allowed to proceed for 4 hours at room temperature and then for 12 hours at 40° C., after which 0.82 parts by weight (0.5 mole percent) of azobisisobutyronitrile was added, and the reaction was continued for a further 24 hours at 60° C. After completion of the reaction, the reaction solution was cooled to room temperature, the benzene was distilled off under reduced pressure, and then the residue was dried at a pressure of 2 to 3 mm. Hg to obtain a syrupy reaction product. The γ-mercaptopropyltrimethoxysilane was nearly quantitively reacted.

The infrared absorption spectra of the starting epoxidized polybutadiene and γ - mercaptopropyltrimethoxysilane and the reaction product were as shown in FIGS. 1 to 3 of the accompanying drawings. Referring to FIGS. 1 to 3, the following observations were made: In FIG. 3, which shows the infrared absorption spectrum of the reaction product, the absorptions at 912 cm.$^{-1}$ and 990 cm.$^{-1}$ due to 1,2-structure, which are clearly seen in FIG. 1 showing the infrared absorption spectrum of epoxidized polybutadiene, are diminished to a great extent, whereas the absorptions at 967 cm.$^{-1}$ due to trans-structure and 675 cm.$^{-1}$ due to cis-structure remain substantially unchanged; in FIG. 3 a strong absorption appears at 1090 cm.$^{-1}$, which is also seen in FIG. 2 showing infrared absorption spectrum of γ-mercaptopropyltrimethoxysilane and which is due to the stretching vibration of Si—O resulting from Si—O—C. From the above observations, it can be understood that γ-mercaptopropyltrimethoxysilane was reacted mainly with the side chain vinyl groups of the epoxidized polybutadiene.

The above fact was confirmed by the quantification of oxirane oxygen. That is, the oxirane oxygen of the epoxidized polybutadiene prior to the reaction and that of the reaction product were quantified to find that the oxirane oxygen prior to the reaction remains substantially unchanged even after the reaction, which means that the above-mentioned addition reaction takes place predominantly at the side chain vinyl group.

The results of elementary analysis of the reaction product were as follows: C, 59.96%, (59.04%); H, 9.17% (9.68%); S, 8.35% (8.12%). The figures in the parentheses are theoretical values when the reactants are reacted in equal weight ratio. These analytical results show that γ-mercaptopropyltrimethoxysilane was reacted in a nearly theoretical amount with epoxidized polybutadiene.

The thus obtained addition-reaction product of epoxidized polybutadiene and γ - mercaptopropyltrimethoxysilane was dissolved in benzene to prepare a solution containing 50% by weight of the reaction product. To the solution was added 2% by weight of an alkylphenol-type emulsifier 5 CX–1002 (trade name; produced by Takemoto Yushi) together with 100 parts by weight of water per 100 parts by weight, in total, of the solution and the emulsifier to emulsify the reaction product in water. The resulting stock emulsion was diluted with water to prepare an emulsion for treating glass fibers having a reaction product content of 1.0% by weight.

Glass fiber cloths (Commodity No. WE–18G–BH, produced by Nitto Boseki) were immersed in the treating emulsion (pH=3; with acetic acid) prepared as above, and then air-dried to obtain surface-treated glass fiber cloths to which 0.25% by weight of the above-said reaction product was adhered. The surface-treated glass fiber cloths were then impregnated with a resin composition comprising 100 parts by weight of an epoxy resin (diglycidyl ether of bisphenol A having a molecular weight of 900, a melting point of 64–76° C. and an epoxy equivalent of 450–525; Epon 1001, trade name, produced by Shell), 4 parts by weight of dicyandiamide (curing agent), 0.2 part by weight of dimethylbenzylamine (curing agent), and 70 parts by weight of dimethyl Cellosolve (solvent). The impregnated glass cloths were air-dried and precured. Twelve sheets of the impregnated glass cloth were placed one on another and then adjusted to a thickness of 2 mm. by means of a spacer, cured in a hot press at 160° C. for 3.5 minutes, then pressed at 160° C. at a pressure of 10 to 30 kg./cm.$^2$ three times each for 2.5 minutes, then at a pressure of 50 kg./cm.$^2$ for 30 minutes, and finally after-cured at 150° C. for one hour.

Thus, there was obtained an excellent glass fiber-reinforced epoxy resin laminate having a dry bending strength of 53.2 kg./mm.$^2$ and a wet bending strength of 37.4 kg./mm.$^2$. On the other hand, the glass fiber cloths were treated (0.25% application level) with γ-glycidoxypropyltrimethoxysilane (Commodity No. A–187, produced by Union Carbide Corporation), which is the most famous glass fiber treating agent for epoxy resins (also applicable for polyester resins). The laminate obtained by using said treated glass cloths had a dry bending strength of 51.0 kg./mm.$^2$ and a wet bending strength of 36.9 kg./mm.$^2$. Consequently, the aforementioned addition-reaction product of the present invention showed a surface-treating effect which is comparable to that of the above-said γ-glycidoxypropyltrimethoxysilane.

The term "wet bending strength" used herein means the bending strength of a test specimen after boiling in water for 2 hours. The dry and wet bending strengths were measured according to the method specified in JIS K–6911.

Example 2

Glass fiber cloths (Commodity No. ECG–181–BH, produced by Nitto Boseki) were immersed in an aqueous emulsion of the addition-reaction product obtained in Example 1 from epoxidized polybutadiene and γ-mercaptopropyltrimethoxysilane, and then dried to obtain treated glass fiber cloths to which 0.28% by weight of said reaction product was adhered. The treated glass fiber cloths were impregnated with an unsaturated polyester resin (Rigolac 1557, trade name, produced by Riken Gosei; a styrene solution of a condensation product of maleic acid and phthalic anhydride with ethylene glycol having a specific gravity of 1.08 and a refractive index of 1.54) containing 1% by weight of benzoyl peroxide as a curing agent. Twelve sheets of the impregnated glass cloth were placed one on another and adjusted to a thickness of 3 mm. by means of a spacer, pressed at 80° C. at a pressure of 30 kg./cm.$^2$ for one hour, and then after-cured at 100° C. for one hour to obtain a glass fiber reinforced polyester resin laminate with good transparency which had a dry bending strength of 38.2 kg./mm.$^2$ and a wet bending strength of 36.2 kg./mm.$^2$.

Example 3

The addition-reaction product obtained in Example 1 was dissolved in acetone to prepare a solution containing 1% by weight of said reaction product. Glass fiber cloths (WE–18G–BH) were immersed in the resulting solution, and then air-dried to obtain treated glass fiber cloths to which 0.2% by weight of the said addition-reaction product was adhered. The treated glass fiber cloths were impregnated with the same epoxy resin composition as used in Example 1, and were air-dried and precured. Twelve sheets of the impregnated glass fiber cloth were placed one on another, and then, in the same manner as in Example 1, cured, pressed, and after-cured to obtain an excellent glass fiber-reinforced epoxy resin laminate having a dry bending strength of 48.9 kg./mm.$^2$ and a wet bending strength of 34.8 kg./mm.$^2$.

Example 4

177 parts by weight of a polybutadiene having 20 mole percent of 1,2-structure epoxidized, which was prepared from the same polybutadiene as used in Example 1, and 238 parts by weight (1 mole percent) of γ-mercaptopropyltriethoxysilane were reacted in the same manner as in Example 1. The said silane compound was substantially quantitatively reacted with the epoxidized polybutadiene to yield a reaction product in which the said silane compound was added to the polybutadiene in a proportion of 41 mole percent based on the 1,2-structure content prior to epoxidation.

The same epoxy resin composition as in Example 1 was admixed with 1% by weight of the above-obtained addition-reaction product. Glass fiber cloths (WE–18G–BH) were impregnated with the resulting epoxy resin composition, and were air-dried and precured. Twelve sheets of the impregnated glass fiber cloth were placed one on another and adjusted to a thickness of 3 mm., and then, in the same manner as in Example 1, cured, pressed, and after-cured to obtain a transparent glass fiber-reinforced epoxy resin laminate having a dry bending strength of 48.9 kg./mm.$^2$ and a wet bending strength of 35.1 kg./mm.$^2$.

Example 5

In the same manner as in Example 1, 3 moles of a polybutadiene having a degree of polymerization of 50 and containing 80 mole percent of 1,2-structure, 15 mole percent of trans-structure and 5 mole percent of cis-structure, about 30 mole percent of said 1,2-structure having been epoxidized, was reacted with 1 mole percent of γ-mercaptopropyltrimethoxysilane to obtain a reaction product in which said silane was added to the polybutadiene in a proportion of about ⅓ mole per mole of the polybutadiene.

The thus obtained addition product was dissolved in benzene to prepare a 50% by weight solution of the reaction product in benzene, to which the same emulsifier as in Example 1 (5 CX–1002) was added in a proportion of 7% by weight together with 100 parts by weight of water per 100 parts by weight of the total of the solution and the emulsifier to emulsify the solution in water. The resulting emulsion was diluted with water to prepare a glass fiber treating emulsion having a concentration of said reaction product of 1.0% by weight (pH of 3 with acetic acid).

In the thus prepared emulsion were immersed 12 sheets of the same glass fiber cloth as in Example 1 and then air-dried to obtain 12 sheets of treated glass fiber cloth, each sheet having adhered thereto 0.28% by weight of the reaction product. The treated glass fiber cloth was then impregnated with the same epoxy resin composition as in Example, 1, air-dried and then pre-cured. 12 sheets of the thus impregnated glass fiber cloth were placed one on another and then subjected to thickness-adjustment, curing, pressing and after-curing in the same manner as in Example 1. As a result, there was obtained a glass fiber-reinforced epoxy resin laminate having a dry bending strength of 52.0 kg./mm.$^2$ and a wet bending strength of 38.7 kg./mm.$^2$.

Example 6

In the same manner as in Example 1, 3 moles of a polybutadiene having a degree of polymerization of 80 and containing 82 mole percent of 1,2-structure, 13 mole percent of trans-structure and 5 mole percent of cis-structure, about 30 mole percent of said 1,2-structure having been epoxidized, was reacted with 1 mole of γ-mercaptopropyltrimethoxysilane to obtain a highly viscous addition reaction product.

One percent by weight of the thus obtained addition product was mixed with the same epoxy resin composition as in Example 1, and 12 sheets of glass fiber cloth (WE–18G–BH) were impregnated with the resulting mixture, air-dried, precured and then placed one on another, after which they were subjected to thickness-adjustment, curing, pressing and after-curing in the same manner as in Example 1. As a result, there was obtained an epoxy resin laminate having a dry bending strength of 50.8 kg./mm.$^2$ and a wet bending strength of 37.1 kg./mm.$^2$.

Example 7

In the same manner as in Example 1, 3 moles of a polybutadiene having a degree of polymerization of 20 and containing 60 mole percent of 1,2-structure, 30 mole percent of trans-structure and 10 mole percent of cis-structure, 16.6 mole percent of said 1,2-structure having been epoxidized, was reacted with 0.9 mole of γ-mercaptopropyltrimethoxysilane to obtain an addition product in which said silane was added to the polybutadiene in a proportion of 50 mole percent based on the 1,2-structure content prior to epoxidation.

The thus obtained additional product was dissolved in benzene, emulsified in water and then diluted with water in the same manner as in Example 1 to obtain an emulsion having a pH value of 3 and a concentration of the addition product of 1.0% by weight. In this emulsion were immersed 12 sheets of glass fiber cloth (WE–18G–BH), and then air-dried to obtain 12 sheets of treated glass fiber cloth in which the addition product was adhered to the cloth in a proportion of 0.3% by weight. The thus treated cloth was impregnated with the same epoxy resin composition as in Example 1, air-dried, and precured. 12 sheets of the thus impregnated cloth were placed one on another and then subjected to thickness-adjustment, curing, pressing and after-curing. As a result, there was obtained an epoxy resin laminate having a dry bending strength of 48.7 kg./mm.$^2$ and a wet bending strength of 34.8 kg./mm.$^2$.

Example 8

In the same manner as in Example 1, 3 moles of a polybutadiene having a degree of polymerization of 20 and containing 95 mole percent of 1,2-structure, and 5 mole percent of trans-structure, about 50 mole percent of said 1,2-structure having been epoxidized, was reacted with 0.6 mole of γ-mercaptopropylthrimethoxysilane to obtain an addition product in which said silane was added to the polybutadiene in a proportion of 21 mole percent based on the 1,2-structure content.

In the same manner as in Example 1, the addition product was dissolved in benzene, emulsified in water and diluted with water to prepare an emulsion having a pH value of 3 and a concentration of the addition product of 1.2% by weight. In this emulsion were immersed 12 sheets of glass fiber cloth (WE–18G–BH) and then air-dried to obtain 12 sheets of treated cloth in which said addition product was adhered to the cloth in a proportion of 0.31% by weight. The treated cloth was impregnated with the same epoxy resin composition as in Example 1, air-dried and precured. 12 sheets of the impregnated cloths were placed one on another and then subjected to thickness-adjustment, curing, pressing and after-curing in the same manner as in Example 1. As a result, there was obtained an epoxy resin laminate having a dry bending strength of 51.9 kg./mm.$^2$ and a wet bending strength of 37.8 kg./mm.$^2$.

Example 9

In the same manner as in Example 1, 3 moles of the same polybutadiene as in Example 8, except that 31.6 mole percent of the 1,2-structure was epoxidized, was reacted with 0.9 mole of δ-mercaptobutyltrimethoxysilane to obtain an addition product in which said silane was added to the polybutadiene in a proportion of 31.6 mole percent based on the 1,2-structure content.

The thus obtained addition product was dissolved in benzene, emulsified in water and then diluted with water in the same manner as in Example 1 to obtain an emulsion having a pH value of 3 and a concentration of the addition product of 1.0% by weight. In the thus obtained emulsion were immersed 12 sheets of glass fiber cloth (WE–18G–BH) and then air-dried to obtain 12 sheets of treated cloth in which said addition product was adhered to the cloth in a proportion of 0.27% by weight. This treated cloth was impregnated with the same epoxy resin composition as in Example 1, air-dried and then precured. 12 sheets of the thus impregnated cloth were subjected to thickness-adjustment, curing, pressing and after-curing in the same manner as in Example 1 to obtain an epoxy resin laminate having a dry blending strength of 54.5 kg./mm.$^2$ and a wet bending strength of 39.0 kg./mm.$^2$.

Example 10

The same addition product as in Example 9 was mixed with the same epoxy resin composition as in Example 1 in a proportion of 0.8% by weight of the former to the latter, and 12 sheets of glass fiber cloth (WE–18G–BH) were impregnated with the resulting mixture, air-dried and then precured. 12 sheets of the thus impregnated cloth were placed one on another and then subjected to thickness-adjustment, curing, pressing and then after-curing in the same manner as in Example 1 to obtain an epoxy resin laminate having a dry bending strength of 50.8 kg./mm.$^2$ and a wet bending strength of 37.8 kg./mm.$^2$.

Example 11

In the same glass fiber treating emulsion as in Example 1, except that the pH was adjusted to 2.0 or 6.0 with acetic acid were immersed 12 sheets of glass fiber cloth (WE–18G–BH) to obtain 12 sheets of treated cloth in which the addition product was adhered to the cloth in a proportion of 0.25% by weight in each case. 12 sheets of the thus treated cloth were thereafter impregnated with the same epoxy resin composition as in Example 1, air-dried, and then precured. 12 sheets of the thus impregnated cloth were placed one on another and then subjected to thickness-adjustment, curing, pressing and then after-curing in the same manner as in Example 1 to obtain an epoxy resin laminate having the following strength:

| pH | Dry strength (kg./mm.²) | Wet strength (kg./mm.²) |
|---|---|---|
| 2.0 | 52.5 | 37.0 |
| 6.0 | 48.5 | 35.1 |

What is claimed is:

1. A glass fiber-reinforced epoxy resin having reactive epoxy groups and prepared by using phenols, bisphenols or aliphatic compounds as a starting material or unsaturated polyester resin composition comprising glass fiber, an epoxy or unsaturated polyester resin, and an agent to promote bonding between the glass and resin at the interface between said resin and said glass, the improvement wherein said agent to promote bonding comprises an amount sufficient to bond said glass fiber and said epoxy resin or unsaturated polyester resin of a reaction product of a polybutadiene having epoxidation rate of 5 to 70 mole percent based on the 1,2-structure content in the polybutadine and having about 50 mole percent to substantially 100 mole percent of 1,2-structure content with a mercaptoorganosilane represented by the general formula,

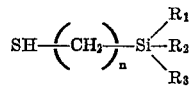

wherein $R_1$, $R_2$ and $R_3$, which may be the same or different, represent hydrolyzable radicals capable of reacting with glass fiber, and $n$ is an integer of from 1 to 4.

2. A composition according to claim 1, wherein 10 to 40 moles percent of the 1,2-structure of the polybutadiene is epoxidized.

3. A composition according to claim 1, wherein the mercaptoorganosilane is mercaptomethyltrimethoxysilane,
β-mercaptoethyltrimethoxysilane,
β-mercaptoethyltriethoxysilane,
β-mercaptoethyltripropyloxysilane,
β-mercaptoethyltrichlorosilane,
β-mercaptoethyltribromosilane,
γ-mercaptopropyltrimethoxysilane,
γ-mercaptopropyltriethoxysilane,
γ-mercaptopropyltris(β-methoxyethoxy)silane,
γ-mercaptopropyltripropyloxysilane,
γ-mercaptopropyltriacetoxysilane,
γ-mercaptopropyltrichlorosilane,
γ-mercaptopropyltribromosilane,
γ-mercaptopropyltriiodosilane,
δ-mercaptobutyltriethoxysilane, or
δ-mercaptobutyltripropyloxysilane.

4. A composition according to claim 1, wherein the mercaptoorganosilane is γ - mercaptopropyltrimethoxysilane.

5. A composition according to claim 1, wherein 10 to 40 mole percent of the 1,2-structure of the polybutadiene are combined with mercaptoorganosilane.

6. A composition according to claim 1, wherein the glass fiber has adhered thereto 0.5 to 1.5% by weight, based on the glass fiber, of the reaction product.

7. A composition according to claim 1, wherein $R_1$, $R_2$ and $R_3$ are each selected from the group consisting of alkoxy groups having 1 to 3 carbon atoms, acetoxy groups and halogens.

8. A glass-reinforced cured product resulting from the interreaciton of the composition of claim 1.

References Cited
UNITED STATES PATENTS

| | | | |
|---|---|---|---|
| 3,471,435 | 10/1969 | Miller | 260—40 R |
| 3,555,051 | 1/1971 | Marsden et al. | 260—40 R X |
| 2,921,921 | 1/1960 | Greenspan et al. | 260—79.5 NV |
| 3,518,213 | 6/1970 | Miyoshi et al. | 260—40 R X |

LEWIS T. JACOBS, Primary Examiner

U.S. Cl. X.R.

260—37 EP, 41 AG